United States Patent
Monobe et al.

(10) Patent No.: US 12,330,716 B2
(45) Date of Patent: Jun. 17, 2025

(54) STEERING CONTROL DEVICE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Kaishi Monobe, Okazaki (JP); Yuji Fujita, Okazaki (JP); Kazuma Hasegawa, Anjo (JP); Yuuta Kajisawa, Okazaki (JP); Yugo Nagashima, Anjo (JP); Takashi Koudai, Okazaki (JP); Kenichi Abe, Okazaki (JP); Masaharu Yamashita, Toyota (JP); Atsushi Satou, Miyoshi (JP); Yosuke Yamashita, Nagoya (JP); Kazuaki Iida, Toyota (JP); Shintaro Takayama, Toyota (JP); Toyohiro Hayashi, Kariya (JP); Hiroki Tomizawa, Kariya (JP); Nobuyori Nakajima, Kariya (JP); Hayaki Tanabe, Kariya (JP); Takeshi Iwana, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 196 days.

(21) Appl. No.: 18/346,639

(22) Filed: Jul. 3, 2023

(65) Prior Publication Data
US 2024/0010267 A1    Jan. 11, 2024

(30) Foreign Application Priority Data
Jul. 8, 2022 (JP) .................................. 2022-110596

(51) Int. Cl.
*B62D 5/00* (2006.01)
*B62D 5/04* (2006.01)

(52) U.S. Cl.
CPC .............. *B62D 5/006* (2013.01); *B62D 5/003* (2013.01); *B62D 5/0484* (2013.01); *B60Y 2306/13* (2013.01)

(58) Field of Classification Search
CPC .... B60Y 2306/13; B62D 5/003; B62D 5/006; B62D 5/0484
See application file for complete search history.

(56) References Cited

U.S. PATENT DOCUMENTS

2021/0031831 A1    2/2021    Yoshizaki et al.
2022/0250676 A1    8/2022    Tomizawa et al.

FOREIGN PATENT DOCUMENTS

| EP | 4 166 423 A2 | 4/2023 |
| JP | 2007-153109 A | 6/2007 |
| JP | 2021-070431 A | 5/2021 |

OTHER PUBLICATIONS

Dec. 11, 2023 extended Search Report issued in European Patent Application No. 23183014.2.

Primary Examiner — Mark L. Greene
(74) Attorney, Agent, or Firm — Oliff PLC (57) ABSTRACT

A steering control device includes a first reaction force control circuit and a second reaction force control circuit. Each of the first reaction force control circuit and the second reaction force control circuit are configured to control a reaction force motor, to execute, at a starting time, a preparation process including a process that requires the steering wheel to automatically rotate through the reaction force motor, and to store, at a time of execution completion of the preparation process, information indicating whether the preparation process has been normally completed. In a case where the first reaction force control circuit has been reset,

(Continued)

when the information indicates that the preparation process has been normally completed, the first reaction force control circuit that has been rest is configured to not execute the preparation process at a time of restarting after completion of the reset.

5 Claims, 6 Drawing Sheets

STEERING CONTROL DEVICE

CROSS-REFERENCE TO RELATED APPLICATION

This application claims priority to Japanese Patent Application No. 2022-110596 filed on Jul. 8, 2022, incorporated herein by reference in its entirety.

BACKGROUND

1. Technical Field

The present disclosure relates to a steering control device.

2. Description of Related Art

There is a so-called steer-by-wire type steering device in which dynamic power transmission between a steering wheel and turning wheels is isolated. For example, a steer-by-wire system in Japanese Unexamined Patent Application Publication No. 2021-70431 includes a reaction force actuator and a turning actuator. The reaction force actuator generates steering reaction force that is given to a steering shaft. The turning actuator generates turning force by which the turning wheels are turned.

Each of the reaction force actuator and the turning actuator includes two control calculation units that are redundantly provided and two motor drive units that are redundantly provided. The control calculation units of each system cause the motor drive units of the system to generate torque, in cooperation with each other. The control calculation unit performs calculations relevant to motor drive control. The motor drive unit generates torque based on a drive signal that is generated by the control calculation unit corresponding to the motor drive unit.

In the steer-by-wire type steering device, the steering wheel is not constrained by a turning mechanism. Therefore, when some kind of external force is applied to the steering wheel while an electric power source of the vehicle is in the off-state, the steering wheel can rotate. At this time, the turning wheels do not operate, and therefore the position relation between the steering wheel and the turning wheels becomes different from the original position relation depending on a predetermined steer angle ratio.

Hence, for example, a control device in Japanese Unexamined Patent Application Publication No. 2007-153109 determines whether the position relation between the steering position of the steering wheel and the turning position of the turning wheels is the original position relation, when the electric power source of the vehicle is in the on-state. When the position relation between the steering position and the turning position is different from the original position relation, the control device changes at least one of the steering position and the turning position such that the position relation between the steering position and the turning position becomes the original position relation.

SUMMARY

It is conceivable to add the function to correct the position relation between the steering position and the turning position in JP 2007-153109 A to the steer-by-wire system in JP 2021-70431 A. However, in this case, there is concern as follows. That is, in some cases, the control calculation unit instantaneously stops the operation due to the failure of the electric power source or the reset of a microcomputer, and thereafter returns to a normal operating state. Therefore, there is fear that the correction process for the position relation between the steering position and the turning position is executed whenever the control calculation unit returns to the normal operating state. Accordingly, there is concern that a driver has a strangeness feeling about an unintended behavior of the steering wheel or the turning wheels due to the execution of the correction process.

A steering control device according to an aspect of the present disclosure includes a first reaction force control circuit and a second reaction force control circuit. Each of the first reaction force control circuit and the second reaction force control circuit are configured to control a reaction force motor configured to generate steering reaction force that is given to a steering wheel isolated from dynamic power transmission for a turning wheel of a vehicle. Each of the first reaction force control circuit and the second reaction force control circuit are configured to execute, at a time of starting, a preparation process including a process that requires the steering wheel to automatically rotate through the reaction force motor. Each of the first reaction force control circuit and the second reaction force control circuit are configured to store, at a time of completion of the execution of the preparation process, information indicating whether the preparation process has been normally completed. In a case where the first reaction force control circuit has been reset, when the information indicates that the preparation process has been normally completed, the first reaction force control circuit that has been reset is configured to not execute the preparation process at a time of restarting after completion of the reset.

With the steering control device according to the aspect of the present disclosure, when there remains the information indicating that the preparation process has been normally completed, the reaction force control circuit that has been reset does not newly execute the preparation process, at the time of the restarting after the completion of the reset. Therefore, it is possible to restrain an unintended behavior of the steering wheel or the turning wheel.

In the steering control device according to the aspect of the present disclosure, at the time of restarting after the completion of the reset, when the information indicates that the preparation process has been normally completed, the first reaction force control circuit that has been reset may be configured to not execute the preparation process, and to transition to a control state of the second reaction force control circuit that has not been reset.

With the steering control device according to the aspect of the present disclosure, after the completion of the reset of the reaction force control circuit that has been reset, the two reaction force control circuits can control the reaction force motor in cooperation again. In the steering control device according to the aspect of the present disclosure, at the time of restarting after the completion of the reset, when the information does not indicate that the preparation process has been normally completed, the first reaction force control circuit that has been reset may be configured to not execute the preparation process, and to stop operation.

With the steering control device according to the aspect of the present disclosure, after the completion of the reset of the reaction force control circuit that has been reset, the reaction force control circuit that has been reset does not newly execute the preparation process. Therefore, it is possible to restrain an unintended behavior of the steering wheel or the turning wheel due to the execution of the preparation process.

The steering control device according to the aspect of the present disclosure may further include two turning control circuits. Each of the two turning control circuits may be configured to control a turning motor configured to generate turning force by which the turning wheel is turned. In this case, one of the two turning control circuits and one of the first reaction force control circuit and the second reaction force control circuit may constitute a single system. At the time of restarting of the first reaction force control circuit that has been reset, when the information does not indicate that the preparation process has been normally completed, the second reaction force control circuit that has not been reset may be configured to execute a process for stopping the operation of the first reaction force control circuit that has been reset and operation of the turning control circuit of a system including the first reaction force control circuit that has been reset.

With the steering control device according to the aspect of the present disclosure, after the stop of the operations of the reaction force control circuit and turning control circuit of the system in which the reset has occurred, the controls of the reaction force motor and the turning motor can be continued by the reaction force control circuit and turning control circuit of the system in which the reset has not occurred.

In the steering control device according to the aspect of the present disclosure, the preparation process may include a middle point learning process and a steer angle synchronization process. The middle point learning process may be a process of learning a steering neutral position of the steering wheel by automatically rotating the steering wheel through drive of the reaction force motor. The steer angle synchronization process may be a process of correcting a rotation position of the steering wheel such that the rotation position of the steering wheel becomes a rotation position corresponding to a turning position of the turning wheel.

In the case where the middle point learning process and the steer angle synchronization process are included in the preparation process, there is fear that the steering wheel automatically rotates at the time of starting of the reaction force control circuit. The steering control device according to the aspect of the present disclosure may be applied in the case where the middle point learning process and the steer angle synchronization process are included in the preparation process.

With the steering control device in the present disclosure, it is possible to restrain an unintended behavior of the steering wheel or the turning wheel.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment in which the steering control device is embodied as a steer-by-wire type steering device will be described below.

Figure 1:
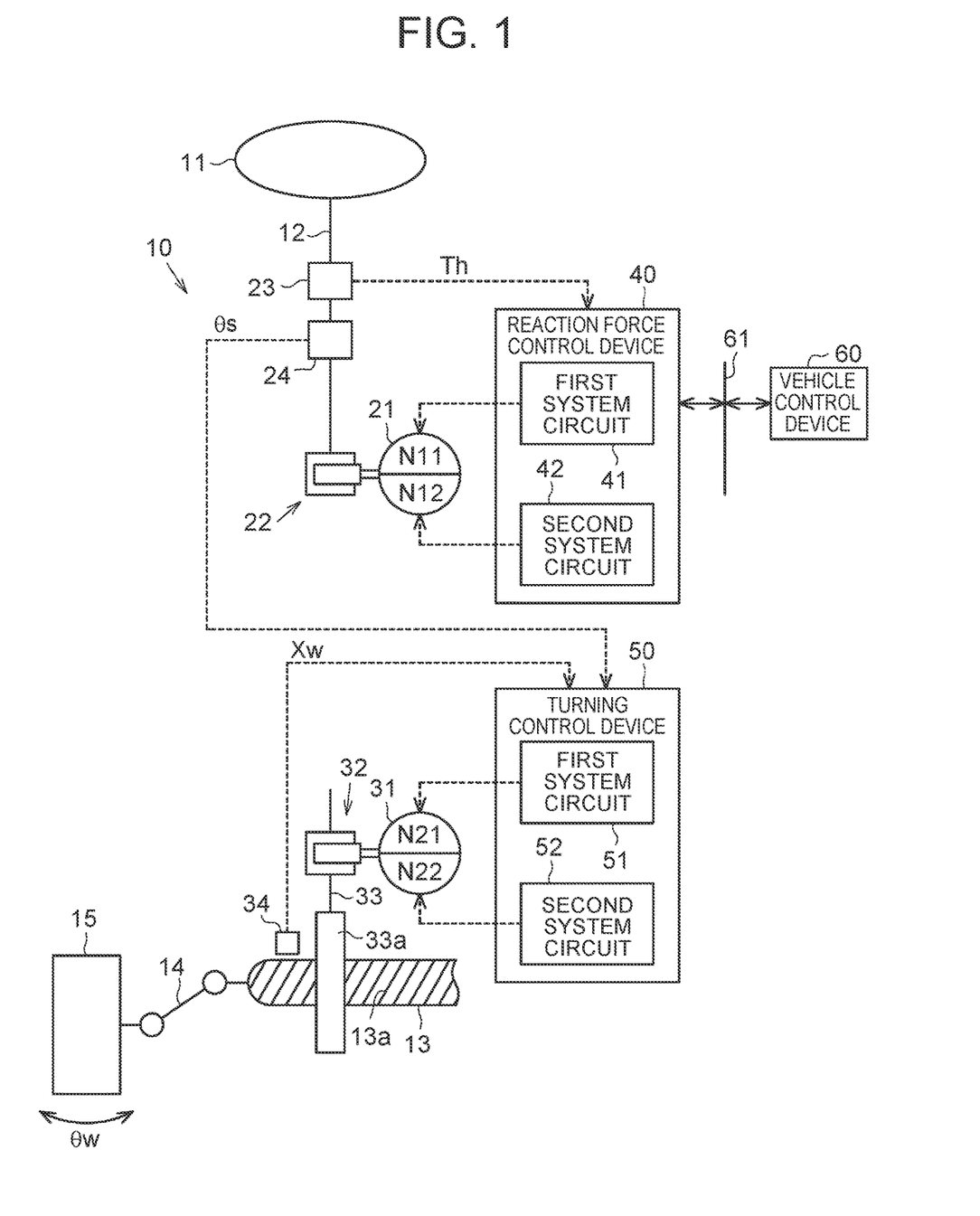
FIG. 1 is a configuration diagram of a steer-by-wire type steering device that is equipped with an embodiment of a steering control device.

As shown in FIG. 1, a steering device 10 of a vehicle includes a steering shaft 12 coupled to a steering wheel 11. Further, the steering device 10 includes a turning shaft 13 that extends along a vehicle width direction (a right-left direction in FIG. 1). Turning wheels 15 are coupled to both ends of the turning shaft 13 through tie rods 14, respectively. The turning shaft 13 linearly moves, so that a turning angle θw of the turning wheels 15 is changed. The steering shaft 12 and the turning shaft 13 constitute a steering mechanism of a vehicle. In FIG. 1, only the turning wheel 15 on one side is illustrated.

The steering device 10 includes a reaction force motor 21 and a speed reduction mechanism 22. The reaction force motor 21 is a generation source of steering reaction force. The steering reaction force is force that acts in the opposite direction of the direction of driver's operation of the steering wheel 11. A rotation shaft of the reaction force motor 21 is coupled to the steering shaft 12 through the speed reduction mechanism 22. The torque of the reaction force motor 21 is given to the steering shaft 12 as the steering reaction force. Since the steering reaction force is given to the steering wheel 11, it is possible to give a moderate hand response feeling to the driver.

For example, the reaction force motor 21 is a three-phase brushless motor. The reaction force motor 21 includes a wound wire group N11 of a first system and a wound wire group N12 of a second system. The wound wire group N11 of the first system and the wound wire group N12 of the second system are wound around a common stator (not illustrated). The wound wire group N11 of the first system and the wound wire group N12 of the second system are the same in electric property.

The steering device 10 includes a turning motor 31 and a speed reduction mechanism 32. The turning motor 31 is a generation source of turning force. The turning force is dynamic force by which the turning wheels 15 are turned. A rotation shaft of the turning motor 31 is coupled to a pinion shaft 33 through the speed reduction mechanism 32. A pinion tooth 33a of the pinion shaft 33 engages with a rack tooth 13a of the turning shaft 13. The torque of the turning motor 31 is given to the turning shaft 13 through the pinion shaft 33 as the turning force. The turning shaft 13 moves along the vehicle width direction, depending on the rotation of the turning motor 31.

For example, the turning motor 31 is a three-phase brushless motor. The turning motor 31 includes a wound wire group N21 of the first system and a wound wire group N22 of the second system. The wound wire group N21 of the first system and the wound wire group N22 of the second system are wound around a common stator (not illustrated). The wound wire group N21 of the first system and the wound wire group N22 of the second system are the same in electric property.

The steering device 10 includes a reaction force control device 40. The reaction force control device 40 controls the drive of the reaction force motor 21 that is a control object. The reaction force control device 40 executes a reaction force control to cause the reaction force motor 21 to generate the steering reaction force depending on a steering torque Th. The reaction force control device 40 calculates a target steering reaction force based on the steering torque Th that is detected through a torque sensor 23. The torque sensor 23 is provided on the steering shaft 12. The reaction force control device 40 controls the electricity supply to the reaction force motor 21 such that the actual steering reaction force to be given to the steering shaft 12 coincides with the target steering reaction force. The reaction force control device 40 controls the electricity supply to the wound wire groups of the two systems in the reaction force motor 21 independently for each system.

The reaction force control device 40 includes a first system circuit 41 and a second system circuit 42. The first system circuit 41 controls the electricity supply to the wound wire group N11 of the first system in the reaction force motor 21, depending on the steering torque Th that is detected through the torque sensor 23. The second system circuit 42 controls the electricity supply to the wound wire group N12 of the second system in the reaction force motor 21, depending on the steering torque Th that is detected through the torque sensor 23.

The reaction force control device 40 and a vehicle control device 60 that is equipped in the vehicle are connected to each other through an in-vehicle network 61. For example, the in-vehicle network 61 is a controller area network (CAN). The reaction force control device 40 and the vehicle control device 60 that is equipped in the vehicle exchange information with each other through the in-vehicle network 61. The vehicle control device 60 controls the traveling of the vehicle. Specifically, the vehicle control device 60 controls a powertrain of the vehicle, for example. The powertrain includes a traveling drive source and dynamic power transmission mechanism of the vehicle. The traveling drive source includes an engine or a motor, for example. The dynamic power transmission mechanism is a mechanism for transmitting the dynamic power generated by the traveling drive source to drive wheels. The reaction force control device 40 controls the drive of the reaction force motor 21 based on the information exchanged with the vehicle control device 60.

The steering device 10 includes a turning control device 50. The turning control device 50 controls the drive of the turning motor 31 that is a control object. The turning control device 50 executes a turning control depending on a steering state. The turning control is a control to cause the turning motor 31 to generate the turning force by which the turning wheels 15 are turned. The turning control device 50 takes in a steering angle θs that is detected through a steer angle sensor 24 and a stroke Xw of the turning shaft 13 that is detected through a stroke sensor 34. The steering angle θs is a state variable that indicates a rotational operation amount of the steering wheel 11. The stroke Xw is a displacement amount from a neutral position of the turning shaft 13, and is a state variable that reflects the turning angle θw. The steer angle sensor 24 is provided between the torque sensor 23 on the steering shaft 12 and the speed reduction mechanism 22. The stroke sensor 34 is provided near the turning shaft 13.

The turning control device 50 calculates a target turning angle of the turning wheels 15, based on the steering angle θs that is detected through the steer angle sensor 24. For example, the target turning angle can be obtained by multiplying the detected steering angle θs by a steer angle ratio. The steer angle ratio is the ratio of the turning angle θw to the steering angle θs. The steer angle ratio is a value that is previously set depending on the product specification and the like. The turning control device 50 calculates the turning angle θw based on the stroke Xw of the turning shaft 13. The stroke Xw is detected through the stroke sensor 34. The turning control device 50 controls the electricity supply to the turning motor 31 such that the turning angle θw to be calculated based on the stroke Xw coincides with the target turning angle. The turning control device 50 controls the electricity supply to the wound wire groups of the two systems in the turning motor 31 independently for each system.

The turning control device 50 includes a first system circuit 51 and a second system circuit 52. The first system circuit 51 controls the electricity supply to the wound wire group N21 of the first system in the turning motor 31, based on the steering angle θs that is detected through the steer angle sensor 24 and the stroke Xw of the turning shaft 13 that is detected through the stroke sensor 34. The second system circuit 52 controls the electricity supply to the wound wire group N22 of the second system in the turning motor 31, based on the steering angle θs that is detected through the steer angle sensor 24 and the stroke Xw of the turning shaft 13 that is detected through the stroke sensor 34.

A so-called mechatronically integrated reaction force actuator may be configured by integrally providing the reaction force control device 40 and the reaction force motor 21. Further, a so-called mechatronically integrated turning actuator may be configured by integrally providing the turning control device 50 and the turning motor 31. The reaction force control device 40 and the turning control device 50 constitute a steering control device.

Reaction Force Control Device

Figure 2:
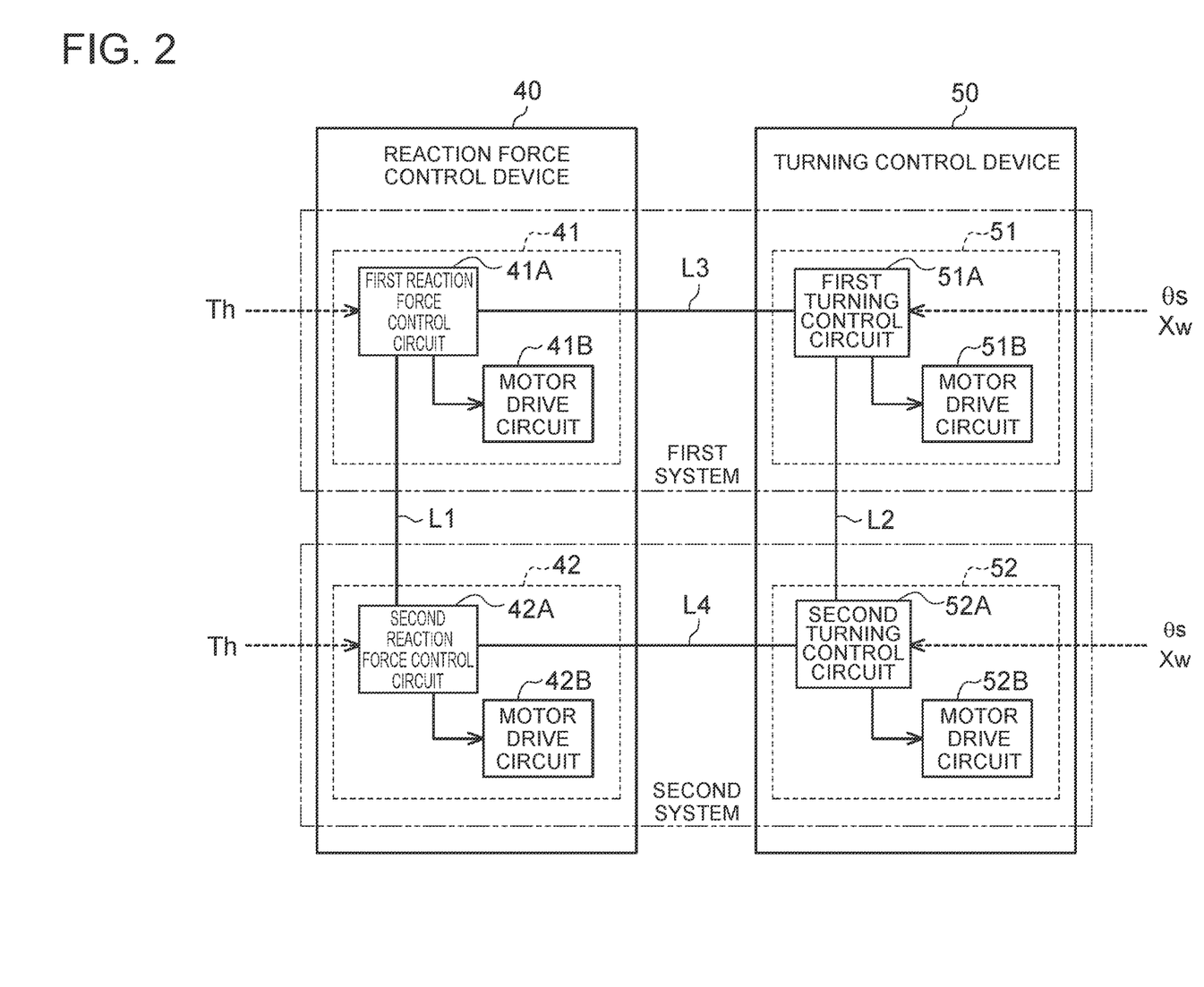
FIG. 2 is a block diagram showing a reaction force control device and a turning control device in the embodiment.

Next, the configuration of the reaction force control device will be described in detail. As shown in FIG. 2, the reaction force control device 40 includes a first system circuit 41 and a second system circuit 42. The first system circuit 41 includes a first reaction force control circuit 41A and a motor drive circuit 41B. The second system circuit 42 includes a second reaction force control circuit 42A and a motor drive circuit 42B.

The first reaction force control circuit 41A is constituted by a processing circuit including (1) one or more processors that operate in accordance with computer programs (software), (2) one or more dedicated hardware circuits that execute at least some processes of various processes, such as application specific integrated circuits (ASIC), or (3) combinations of processors and dedicated hardware circuits. The processor includes a central processing unit (CPU). Further, the processor includes a random-access memory (RAM), and a memory such as a read-only memory (ROM). The memory stores program codes or commands configured such that the CPU executes processes. The memory, that is, the non-transitory computer-readable medium includes all usable media that can be accessed by general-purpose or dedicated computers.

The first reaction force control circuit 41A calculates the target steering reaction force to be generated by the reaction force motor 21, based on the steering torque Th that is detected through the torque sensor 23. Further, the first reaction force control circuit 41A calculates a first current command value for the wound wire group N11 of the first system, depending on the value of the calculated target steering reaction force. The first current command value is set to half (50%) of a current amount (100%) that is needed for causing the reaction force motor 21 to generate the target steering reaction force. The first reaction force control circuit 41A executes a current feedback control such that the actual value of the electric current to be supplied to the wound wire group N11 of the first system follows the first current command value, and thereby generates a drive signal (PWM signal) for the motor drive circuit 41B.

The motor drive circuit 41B is a PWM inverter in which switching elements, for example, two field effect transistors (FET) connected in series, are adopted as a leg that is a basic unit and in which three legs respectively corresponding to three phases (U, V and W) are connected in parallel. The motor drive circuit 41B switches the switching elements for the respective phases, based on the drive signal that is generated by the first reaction force control circuit 41A, and thereby converts direct-current power supplied from a battery, into three-phase alternating-current power. The three-phase alternating-current power generated by the motor drive circuit 41B is supplied to the wound wire group N11 of the first system in the reaction force motor 21, through electricity supply paths for the respective phases that are constituted by a bus bar, a cable or the like. Thereby, the wound wire group N11 of the first system generates torque depending on the first current command value.

The second reaction force control circuit 42A basically has the same configuration as the first reaction force control circuit 41A. The second reaction force control circuit 42A calculates the target steering reaction force to be generated by the reaction force motor 21, based on the steering torque Th that is detected through the torque sensor 23. Further, the second reaction force control circuit 42A calculates a second current command value for the wound wire group N12 of the second system, depending on the value of the calculated target steering reaction force. The second current command value is set to half (50%) of a current amount that is needed for causing the reaction force motor 21 to generate the target steering reaction force. The second reaction force control circuit 42A executes a current feedback control such that the actual value of the electric current to be supplied to the wound wire group N12 of the second system follows the second current command value, and thereby generates a drive signal for the motor drive circuit 42B.

The motor drive circuit 42B basically has the same configuration as the motor drive circuit 41B. The motor drive circuit 42B converts direct-current power supplied from the battery into three-phase alternating-current power, based on the drive signal that is generated by the second reaction force control circuit 42A. The three-phase alternating-current power generated by the motor drive circuit 42B is supplied to the wound wire group N12 of the second system in the reaction force motor 21, through electricity supply paths for the respective phases that are constituted by a bus bar, a cable or the like. Thereby, the wound wire group N12 of the second system generates torque depending on the second current command value. The reaction force motor 21 generates the total torque resulting from adding the torque generated by the wound wire group N11 of the first system and the torque generated by the wound wire group N12 of the second system.

Depending on the product specification, the first system circuit 41 and second system circuit 42 of the reaction force control device 40 may have a leader-follower relation. In this case, for example, the first system circuit 41 may function as a leader, and the second system circuit 42 may functions as a follower. Further, depending on the product specification, the first system circuit 41 and the second system circuit 42 may have a fifty-fifty relation.

Turning Control Device

Next, the configuration of the turning control device 50 will be described in detail. As shown in FIG. 2, the turning control device 50 includes a first system circuit 51 and a second system circuit 52. The first system circuit 51 includes a first turning control circuit 51A and a motor drive circuit 51B. The second system circuit 52 includes a second turning control circuit 52A and a motor drive circuit 52B.

The first turning control circuit 51A basically the same configuration as the first reaction force control circuit 41A. The first turning control circuit 51A calculates the target turning angle of the turning wheels 15, based on the steering angle θs that is detected through the steer angle sensor 24. The turning control device 50 calculates the turning angle θw based on the stroke Xw of the turning shaft 13 that is detected through the stroke sensor 34. The first turning control circuit 51A calculates a target turning force to be generated by the turning motor 31, by executing an angle feedback control such that the turning angle θw to be calculated based on the stroke Xw follows the target turning angle, and calculates a third current command value for the wound wire group N21 of the first system in the turning motor 31, depending on the value of the calculated target turning force. The third current command value is set to half (50%) of a current amount that is needed for causing the turning motor 31 to generate the target turning force. The first turning control circuit 51A executes a current feedback control such that the actual value of the electric current to be supplied to the wound wire group N21 of the first system follows the third current command value, and thereby generates a drive signal for the motor drive circuit 51B.

The motor drive circuit 51B basically has the same configuration as the motor drive circuit 41B. The motor drive circuit 51B converts direct-current power supplied from the battery into three-phase alternating-current power, based on the drive signal generated by the first turning control circuit 51A. The three-phase alternating-current power generated by the motor drive circuit 42B is supplied to the wound wire group N21 of the first system in the turning motor 31, through electricity supply paths for the respective phases that are constituted by a bus bar, a cable or the like. Thereby, the wound wire group N21 of the first system generates torque depending on the third current command value.

The second turning control circuit 52A basically has the same configuration as the first reaction force control circuit 41A. The second turning control circuit 52A calculates the target turning angle of the turning wheels 15, based on the steering angle θs that is detected through the steer angle sensor 24. The turning control device 50 calculates the turning angle θw based on the stroke Xw of the turning shaft 13 that is detected through the stroke sensor 34. The second turning control circuit 52A calculates the target turning force to be generated by the turning motor 31, by executing an angle feedback control such that the turning angle θw to be calculated based on the stroke Xw follows the target turning angle, and calculates a fourth current command value for the wound wire group N22 of the second system in the turning motor 31, depending on the value of the calculated target turning force. The fourth current command value is set to half (50%) of a current amount that is needed for causing the turning motor 31 to generate the target turning force. The second turning control circuit 52A executes a current feedback control such that the actual value of the electric current to be supplied to the wound wire group N22 of the second system follows the fourth current command value, and thereby generates a drive signal for the motor drive circuit 52B.

The motor drive circuit 52B basically has the same configuration as the motor drive circuit 41B. The motor drive circuit 52B converts direct-current power supplied from the battery into three-phase alternating-current power, based on the drive signal generated by the second turning control circuit 52A. The three-phase alternating-current power generated by the motor drive circuit 52B is supplied to the wound wire group N22 of the second system in the turning motor 31, through electricity supply paths for the respective phases that are constituted by a bus bar, a cable or the like. Thereby, the wound wire group N22 of the second system generates torque depending on the fourth current command value. The turning motor 31 generates the total torque resulting from adding the torque generated by the wound wire group N21 of the first system and the torque generated by the wound wire group N22 of the second system.

Depending on the product specification, the first system circuit 51 and second system circuit 52 of the turning control device 50 may have a leader-follower relation. In this case, for example, the first system circuit 51 may function as a leader, and the second system circuit 52 may function as a follower. Further, depending on the product specification, the first system circuit 51 and the second system circuit 52 may have a fifty-fifty relation.

Communication Path

Next, communication paths within the reaction force control device 40 and the turning control device 50 and communication paths between the reaction force control device 40 and the turning control device 50 will be described.

As shown in FIG. 2, the first reaction force control circuit 41A and the second reaction force control circuit 42A exchange information with each other through a communication line L1. The information includes abnormality information about the first reaction force control circuit 41A, the second reaction force control circuit 42A, or the motor drive circuits 41B, 42B. Further, the information includes the values of flags that indicate various states. The first reaction force control circuit 41A and the second reaction force control circuit 42A control the drive of the reaction force motor 21 in cooperation, based on the information exchanged with each other.

The first turning control circuit 51A and the second turning control circuit 52A exchange information with each other through a communication line L2. The information includes abnormality information about the first turning control circuit 51A, the second turning control circuit 52A, or the motor drive circuits 51B, 52B. Further, the information includes the values of flags that indicate various states. The first turning control circuit 51A and the second turning control circuit 52A control the drive of the turning motor 31 in cooperation, based on the information exchanged with each other.

The first reaction force control circuit 41A and the first turning control circuit 51A exchange information with each other through a communication line L3. The information includes abnormality information about the first reaction force control circuit 41A, the first turning control circuit 51A, and the motor drive circuits 41B, 51B. Further, the information includes the values of flags that indicate various states. The first reaction force control circuit 41A and the first turning control circuit 51A operate in coordination, based on the information exchanged with each other.

The second reaction force control circuit 42A and the second turning control circuit 52A exchange information with each other through a communication line L4. The information includes abnormality information about the second reaction force control circuit 42A, the second turning control circuit 52A, or the motor drive circuits 42*n*, 52B. Further, the information includes the values of flags that indicate various states. The second reaction force control circuit 42A and the second turning control circuit 52A operate in coordination, based on the information exchanged with each other.

Drive Mode of Motor

Next, the drive mode of the reaction force motor 21 and the turning motor 31 will be described. The drive mode includes a cooperative drive mode, an independent drive mode, and a single-system drive mode.

The cooperative drive mode is a drive mode at an ordinary time during which the first system circuits 41, 51 and the second system circuits 42, 52 normally operate. The first system circuit 41 and the second system circuit 42 share information such as command values and limiting values, with each other, and cause both of the wound wire group N11 of the first system and the wound wire group N12 of the second system in the reaction force motor 21 to generate an equivalent torque. The first system circuit 51 and the second system circuit 52 share information such as command values and limiting values, with each other, and cause both of the wound wire group N21 of the first system and the wound wire group N22 of the second system in the turning motor 31 to generate an equivalent torque.

In the case where the first system circuit 41 and second system circuit 42 of the reaction force control device 40 have a leader-follower relation, when the cooperative drive mode is selected as the drive mode, the follower controls the drive of the reaction force motor 21, using a command value that is calculated by the leader. Further, in the case where the first system circuit 51 and second system circuit 52 of the turning control device 50 have a leader-follower relation, when the cooperative drive mode is selected as the drive mode, the follower controls the drive of the turning motor 31, using a command value that is calculated by the leader.

The independent drive mode is a drive mode in the case where the operation of one of the four control circuits (41A, 42A, 51A, 52A) has been instantaneously stopped but the decision of abnormality has not been made and where there is a possibility of the return to the normal operation. In the independent drive mode, for example, when there is a possibility that the one control circuit in which the operation has been stopped returns to the normal operation, each of the other three control circuits does not use the information obtained through the communication between the systems, and causes the wound wire group corresponding to the control circuit to generate torque, based on the calculation result of the control circuit.

In the case where the first system circuit 41 and second system circuit 42 of the reaction force control device 40 have a leader-follower relation, when the independent drive mode is selected as the drive mode, the leader-follower relation between the first system circuit 41 and the second system circuit 42 is dissolved once. Further, in the case where the first system circuit 51 and second system circuit 52 of the turning control device 50 have a leader-follower relation, when the independent drive mode is selected as the drive mode, the leader-follower relation between the first system circuit 51 and the second system circuit 52 is dissolved once.

The single-system drive mode is a drive mode in the case where the decision of the abnormality of one of the four control circuits (41A, 42A, 51A, 52A) has been made and where there is no possibility of the return to the normal operation. For example, when the decision of the abnormality of the first system circuits 41, 51 has been made, only the second system circuits 42, 52 cause the reaction force motor 21 and the turning motor 31 to generate torque. When the decision of the abnormality of the second system circuits 42, 52 has been made, only the first system circuits 41, 51 cause the reaction force motor 21 and the turning motor 31 to generate torque.

In the case where the first system circuit 41 and second system circuit 42 of the reaction force control device 40 have a leader-follower relation, when the single-system drive mode is selected as the drive mode, the leader-follower relation between the first system circuit 41 and the second system circuit 42 is dissolved once. Further, in the case where the first system circuit 51 and second system circuit 52 of the turning control device 50 have a leader-follower relation, when the single-system drive mode is selected as the drive mode, the leader-follower relation between the first system circuit 51 and the second system circuit 52 is dissolved once.

At the ordinary time during which the abnormality has not occurred, the control circuits (41A, 42A, 51A, 52A) controls the drives of the motors (21, 31) in the cooperative drive mode. When an abnormality determination condition is satisfied in a state where the cooperative drive mode is selected as the drive mode, the control circuits switch the drive mode from the cooperative drive mode to the independent drive mode. Further, when a return determination condition is satisfied before the decision of the abnormality in a state where the independent drive mode is selected as the drive mode, the control circuits return the drive mode from the independent drive mode to the cooperative drive mode. Further, when an abnormality decision condition is satisfied in a state where the independent drive mode is selected as the drive mode, the control circuits switch the drive mode from the independent drive mode to the single-system drive mode.

Examples of the abnormality include a communication abnormality between the systems, a communication abnormality in an identical system, a deviation in command values between the systems, and a temporary abnormality for which recovery is possible, such as a decrease in a current limiting value.

Starting Sequence Next, starting sequences for the reaction force control device 40 and the vehicle control device 60 will be described. Each starting sequence is a series of processes that is executed when an electric power source of the vehicle is turned on. During a period when the electric power source of the vehicle is in the off-state, the reaction force control device 40 and the vehicle control device 60 are maintained in a state where the operations are stopped. Turning on or off the electric power source of the vehicle means turning on or off a starting switch provided at a driver's seat, for example. The starting switch is operated when the traveling drive source of the vehicle is started up or stopped, and is an ignition switch or a power switch, for example.

First, the starting sequence for the vehicle control device 60 will be described.

Figure 3:
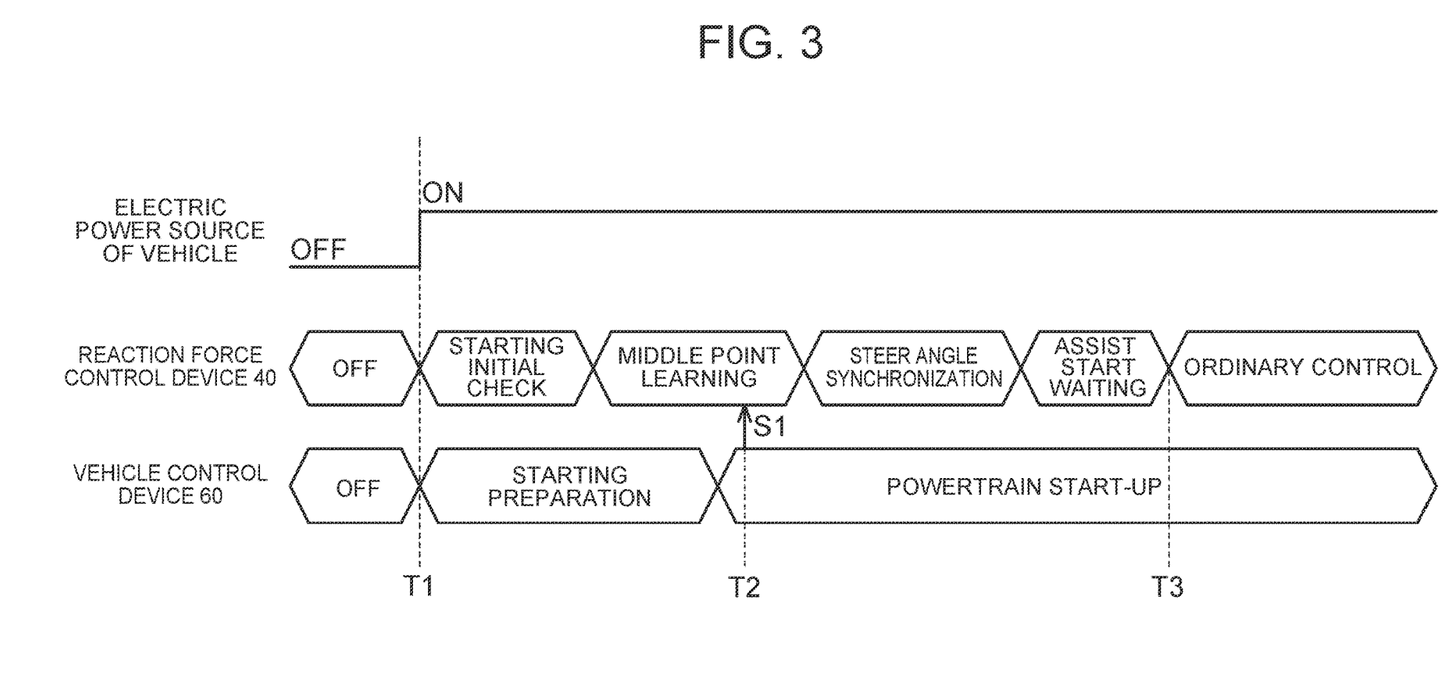
FIG. 3 is a time chart showing a starting sequence for the reaction force control device and a vehicle control device in the embodiment.

As shown in a time chart in FIG. 3, when the electric power source of the vehicle is turned on (time T1), the vehicle control device 60 starts the execution of a predetermined starting preparation. The starting preparation includes an initial check of the vehicle control device 60 and processes that are needed for starting up the powertrain of the vehicle. After the starting preparation is completed, the vehicle control device 60 starts up the powertrain (mainly the traveling drive source). When the execution of the start-up process of the powertrain is completed, the vehicle control device 60 turns on a preparation completion signal S1 (time T2). The vehicle control device 60 turns on the preparation completion signal S1 regardless of the state of the reaction force control device 40.

The preparation completion signal S1 is information indicating whether the vehicle can travel because of the completion of traveling preparation of the vehicle, including the completion of the execution of the start-up process of the powertrain. When the preparation completion signal S1 is in the on-state, the preparation completion signal S1 indicates that the vehicle is in a state where the vehicle can travel. When the preparation completion signal S1 is in the off-state, the preparation completion signal S1 indicates that the vehicle is not in the state where the vehicle can travel. The preparation completion signal S1 is transmitted to the reaction force control device 40 as an electric signal.

Next, the starting sequence for the reaction force control device 40 will be described. The starting sequence is executed by each of the first reaction force control circuit 41A and the second reaction force control circuit 42A. As shown in the time chart in FIG. 3, when the electric power source of the vehicle is turned on (time T1), the reaction force control device 40 starts, serially executes an initial check, a middle point learning process, and a steer angle synchronization process, and then transitions to an assist start waiting state. The initial check, the middle point learning process, and the steer angle synchronization process are included in a series of preparation processes that is needed for starting the execution of the reaction force control to cause the reaction force motor 21 to generate the steering reaction force.

The initial check is an initial inspection that is executed when the electric power source of the vehicle is turned on, and for example, includes the check of hardware, the initialization of a central processing unit (CPU), and the initialization of variables, flags, or the like.

The middle point learning process is a process for learning a steering neutral position of the steering wheel 11. The steering device 10 includes a stopper mechanism that restricts the rotation of the steering wheel 11 for providing a limit of the steering angle of the steering wheel 11. For example, the stopper mechanism restricts the steering range of the steering wheel 11 to less than 360°. The reaction force control device 40 operates the steering wheel 11 to a first operation end and thereafter reversely operates the steering wheel 11 to a second operation end, through the control of the reaction force motor 21. Thereafter, the reaction force control device 40 calculates the middle point of the steering angle, based on rotation angles of the reaction force motor 21 at the start time and end time of the reverse operation of the steering wheel 11. The middle point of the steering angle corresponds to a motor middle point that is the rotation position of the reaction force motor 21 when the steering wheel 11 is at the steering neutral position. The reaction force control device 40 stores the middle point of the steering angle or the motor middle point in the memory, as the steering neutral position of the steering wheel 11.

In the case where the information relevant to the steering neutral position stored in the memory has been lost, the reaction force control device 40 learns the steering neutral position of the steering wheel 11. Examples of this case include a case where the electric power source of the vehicle is turned on for the first time after a battery is newly attached to the vehicle. This is because the information relevant to the steering neutral position stored in the memory of the reaction force control device 40 is lost due to the stop of the supply of electric power to the reaction force control device 40 when the battery is detached from the vehicle in the replacement work for the battery.

Depending on the product specification and the like, the reaction force control device 40 may execute the middle point learning process whenever the electric power source is turned on, or may execute the middle point learning process when the reliability of the information relevant to the steering neutral position stored in the memory is low.

The steer angle synchronization process is a process for correcting the rotation position of the steering wheel 11. When the rotation position of the steering wheel 11 is a position that is different from a rotation position corresponding to the turning position of the turning wheels 15, the reaction force control device 40 drives the reaction force motor 21 such that the rotation position of the steering wheel 11 becomes the rotation position corresponding to the turning position of the turning wheels 15.

For example, when the electric power source of the vehicle is turned off, the reaction force control device 40 stores the steering angle θs detected immediately before the electric power source of the vehicle is turned off, as a reference steering angle. The reference steering angle is a reference for determining whether the steering wheel 11 has rotated in a period during which the electric power source of the vehicle is in the off-state. When the steering angle θs immediately after the electric power source of the vehicle is turned on does not coincide with the reference steering angle, the reaction force control device 40 calculates the difference between the steering angle θs immediately after the electric power source of the vehicle is turned on and the reference steering angle, and controls the electricity supply to the reaction force motor 21 such that the difference is eliminated.

The reaction force control device 40 may calculate the difference between the value of the steering angle θs immediately after the electric power source of the vehicle is turned on and a value resulting from multiplying the turning angle θw immediately after the electric power source of the vehicle is turned on by the reciprocal of the steering angle ratio, and may control the electricity supply to the reaction force motor 21 such that the difference is eliminated.

The assist start waiting state is a state of waiting for the confirmation of the completion of the execution of the start-up process of the powertrain by the vehicle control device 60 after the completion of the execution of the preparation process. The reaction force control device 40 determines whether to transition from the assist start waiting state to an ordinary control state, depending on the start-up state of the powertrain of the vehicle. When the preparation completion signal S1 has not been turned on by the vehicle control device 60, the reaction force control device 40 determines that the execution of the start-up process of the powertrain of the vehicle has not been completed, and maintains the assist start waiting state. When the preparation completion signal S1 has been turned on by the vehicle control device 60, the reaction force control device 40 determines that the execution of the start-up process of the powertrain of the vehicle has been completed (time T3), and transitions from the assist start waiting state to the ordinary control state. The ordinary control state is a state of executing the reaction force control to cause the reaction force motor 21 to generate the steering reaction force. In the ordinary control state, the reaction force control device 40 controls the drive of the reaction force motor 21 depending on the steering state of the steering wheel 11.

In the time chart in FIG. 3, as an example, the vehicle control device 60 turns on the preparation completion signal S1 during the execution of the middle point learning process. In the case where the electric power source of the vehicle has been turned on, when the execution of the starting sequence has been completed, the first reaction force control circuit 41A stores information indicating whether the starting sequence has been normally completed, in the memory. For example, the first reaction force control circuit 41A sets the value of a flag depending on whether the starting sequence has been normally completed. When the starting sequence has been normally completed, the first reaction force control circuit 41A sets the value of the flag to one. When the starting sequence has not been normally completed, the first reaction force control circuit 41A sets the value of the flag to zero. The flag is information indicating whether the starting sequence has been normally completed. Similarly to the first reaction force control circuit 41A, the second reaction force control circuit 42A stores information indicating whether the starting sequence has been normally completed, in the memory, when the execution of the starting sequence has been completed. The first reaction force control circuit 41A and the second reaction force control circuit 42A can mutually confirm the values of the flags, by communication.

Each of the first turning control circuit 51A and the second turning control circuit 52A also executes a predetermined starting sequence, when the electric power source of the vehicle is turned on.

Supplemental Description about Control Circuit

Next, the configuration of each control circuit (41A, 42A, 51A, 52A) will be supplementally described.

For the electric power source voltage of each control circuit, an operation guarantee range is set. The operation guarantee range is a voltage range in which the operation is guaranteed in the specification. Each control circuit starts the operation and executes the starting sequence shown in the above time chart in FIG. 3, when the electric power source voltage changes from a value outside the operation guarantee range to a value within the operation guarantee range.

Each control circuit has a reset function. When a predetermined reset factor occurs, the control circuit is reset. The reset is a process for initializing the internal state of the control circuit. Examples of the reset factor include the decrease in the electric power source voltage of the control circuit. When the electric power source voltage temporarily decreases and the value of the electric power source voltage falls outside the operation guarantee range, the control circuit is reset. When the reset is completed, the control circuit restarts, and executes the starting sequence shown in the above time chart in FIG. 3 again.

However, the reset of the control circuit causes the following concern.

Figure 4A:
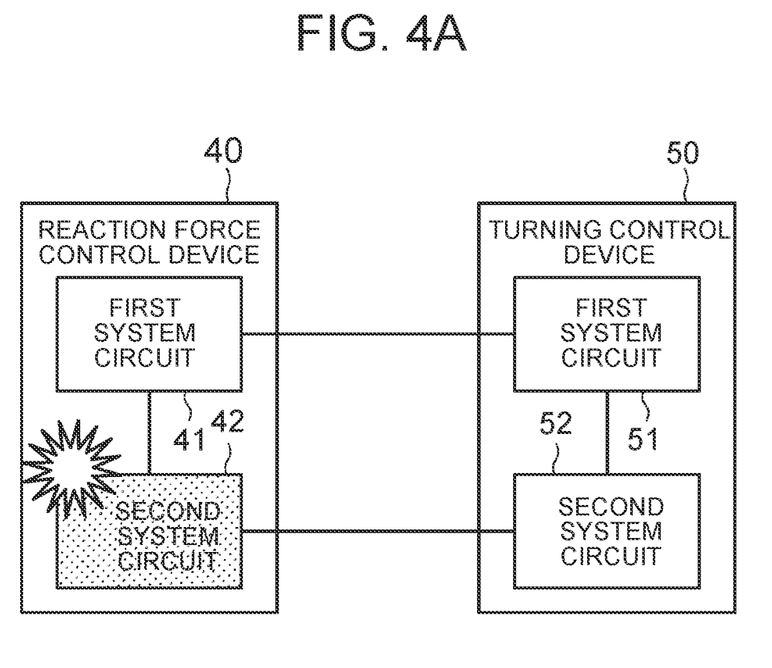
FIG. 4A is a configuration diagram showing an exemplary situation where a reset occurs in the reaction force control device and the turning control device in the embodiment.

It is possible that the second reaction force control circuit 42A of the second system circuit 42, for example, is reset in the ordinary control state where the control circuits (41A, 42A, 51A, 52A) execute the controls of the reaction force motor 21 and the turning motor 31, as shown in FIG. 4A.

After the reset is completed, the second reaction force control circuit 42A restarts. At the time of the restarting, the second reaction force control circuit 42A executes the starting sequence shown in the above time chart in FIG. 3. The starting sequence includes the middle point learning process and the steer angle synchronization process. During the execution of these processes, there is fear that the steering wheel 11 automatically rotates for learning the steering neutral position of the steering wheel 11 or for correcting the rotation position of the steering wheel 11.

At this time, the first reaction force control circuit 41A of the first system circuit 41 that has not been reset continues the control of the reaction force motor 21 in an ordinary way. That is, the first reaction force control circuit 41A controls the drive of the reaction force motor 21, depending on the steering torque Th. On the other hand, the second reaction force control circuit 42A that restarts controls the drive of the reaction force motor 21 for learning the steering neutral position or for correcting the rotation position of the steering wheel 11. Therefore, there is fear that the control by the first reaction force control circuit 41A and the control by the second reaction force control circuit 42A interfere with each other. Further, there is fear that the steering wheel 11 automatically rotates unintentionally.

The first turning control circuit 51A and the second turning control circuit 52A that have not been reset continue the control of the turning motor 31 in an ordinary way. That is, the second turning control circuit 52A controls the turning angle θw of the turning wheels 15, based on the steering angle θs that is detected through the steer angle sensor 24. Therefore, there is fear that the turning wheels 15 automatically turn due to the automatic rotation of the steering wheel 11. This turning is a turning that is not intended by the driver.

Figure 4B:
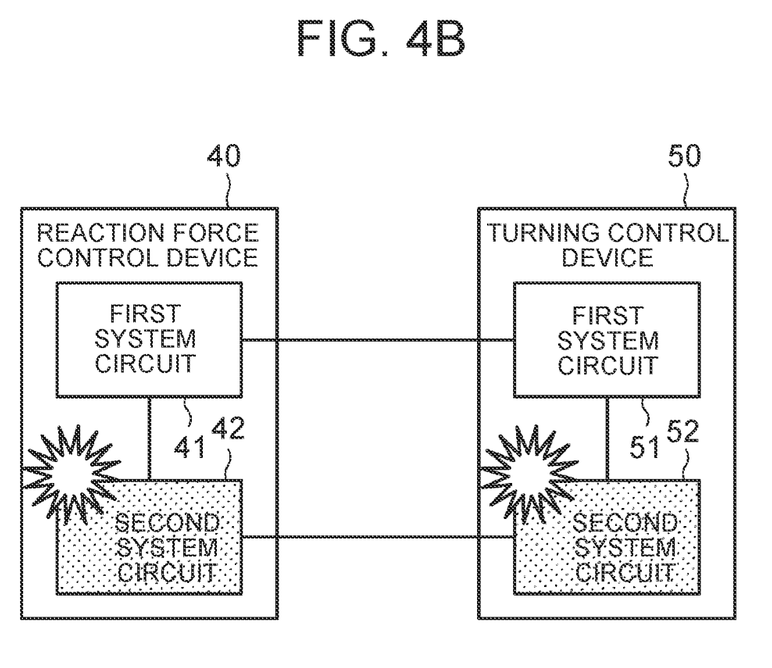
FIG. 4B is a configuration diagram showing an exemplary situation where a reset occurs in the reaction force control device and the turning control device in the embodiment.

This phenomenon can occur also in the case where only the first reaction force control circuit 41A of the first system circuit 41 is reset. Further, this phenomenon can occur also in the case where both the second reaction force control circuit 42A of the second system circuit 42 and the second turning control circuit 52A of the second system circuit 52 are reset, as shown in FIG. 4B. Further, this phenomenon can occur also in the case where both the first reaction force control circuit 41A of the first system circuit 41 and the first turning control circuit 51A of the first system circuit 51 are reset.

Hence, the control circuits (41A, 42A, 51A, 52A) execute processes for coping with the reset.

Process in Reaction Force Control Circuit

Next, a process that copes with the reset and that is executed by the first reaction force control circuit 41A and the second reaction force control circuit 42A will be described. The process for coping with the reset has two processing patterns.

First Processing Pattern

First, a first processing pattern will be described.

Figure 5A:
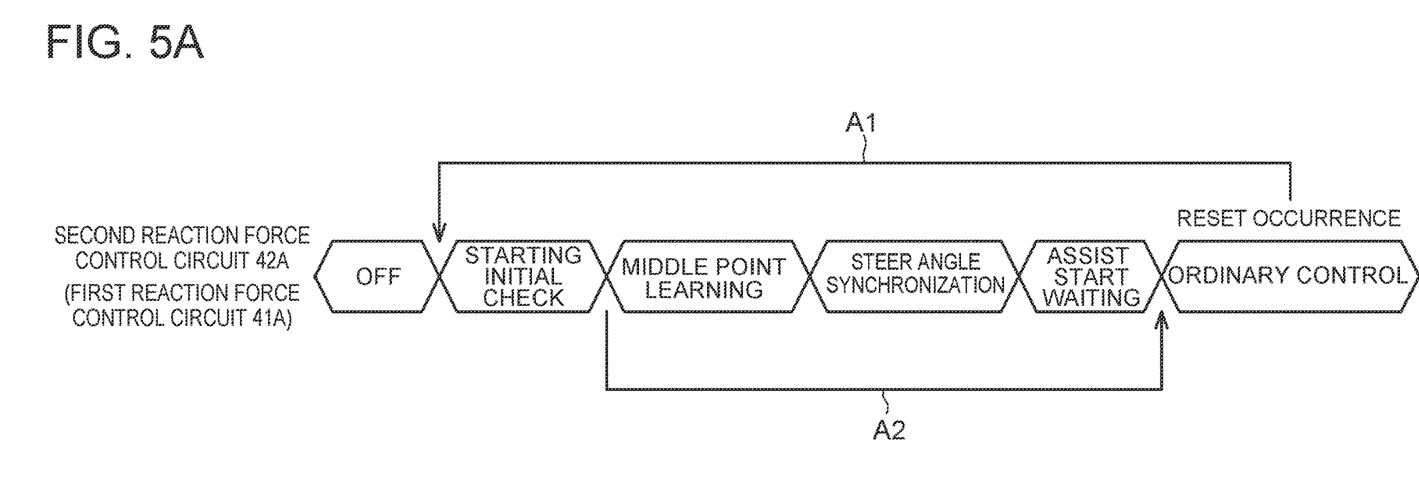
FIG. 5A is a time chart showing an exemplary state transition of a second reaction force control circuit in the embodiment.

A case where only the second reaction force control circuit 42A is reset when the control circuits are executing the ordinary control as shown in FIG. 5A will be described as an example. The other three control circuits (41A, 51A, 52A) continue the execution of the ordinary control.

As shown by an arrow A1 in FIG. 5A, after the reset is completed, the second reaction force control circuit 42A restarts. The second reaction force control circuit 42A that restarts starts the execution of the initial check. When the second reaction force control circuit 42A restarts, the first reaction force control circuit 41A that has not been reset confirms the state of the second reaction force control circuit 42A. The first reaction force control circuit 41A can recognize the state of the second reaction force control circuit 42A, by communication.

When the value of the flag stored in the memory of the second reaction force control circuit 42A is one, the first reaction force control circuit 41A determines that the second reaction force control circuit 42A does not need to continue the execution of the starting sequence. This is because the starting sequence has been normally completed when the value of the flag is one. The normal completion of the starting sequence includes the normal completion of the middle point learning process and the steer angle synchronization process. Therefore, when the value of the flag is one, the steering neutral position of the steering wheel 11 that is stored in the memory is valid, and can be used for the control of the reaction force motor 21. The second reaction force control circuit 42A can recognize the determination result of the first reaction force control circuit 41A, by communication.

At the time of the restarting due to the reset, the second reaction force control circuit 42A itself may confirm the value of the flag stored in the memory of the second reaction force control circuit 42A. As shown by an arrow A2 in FIG. 5A, when it is determined that the second reaction force control circuit 42A does not need to continue the execution of the starting sequence, the second reaction force control circuit 42A does not execute the middle point learning process and the steer angle synchronization process, and transitions to the same control state as the first reaction force control circuit 41A.

The second reaction force control circuit 42A can recognize the control state of the first reaction force control circuit 41A, by communication. In this case, the control state of the first reaction force control circuit 41A is the ordinary control state. Therefore, the second reaction force control circuit 42A causes the control state of the second reaction force control circuit 42A to transition to the ordinary control state. Thereby, the first reaction force control circuit 41A and the second reaction force control circuit 42A can control the drive of the reaction force motor 21 in cooperation again.

Incidentally, it is also possible that only the second reaction force control circuit 42A is reset when the control circuits are in the assist start waiting state. The other three control circuits (41A, 51A, 52A) are in the assist start waiting state. In this case, the second reaction force control circuit 42A executes the same process as the process when the reset is performed during the execution of the ordinary control.

Figure 5B:
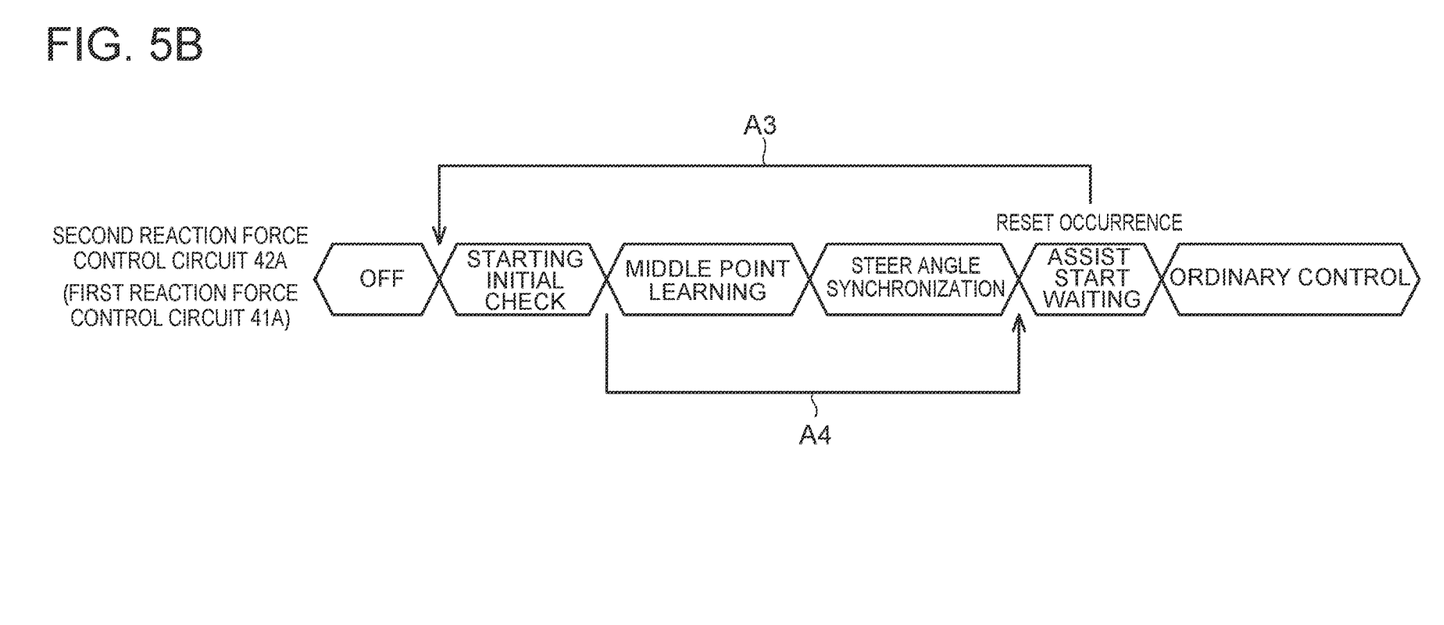
FIG. 5B is a time chart showing an exemplary state transition of the second reaction force control circuit in the embodiment.

As shown by an arrow A3 in FIG. 5B, after the reset is completed, the second reaction force control circuit 42A restarts. The second reaction force control circuit 42A that restarts starts the execution of the initial check. When the second reaction force control circuit 42A restarts, the first reaction force control circuit 41A that has not been reset confirms the state of the second reaction force control circuit 42A.

As shown by an arrow A4 in FIG. 5B, when it is determined that the second reaction force control circuit 42A does not need to continue the execution of the starting sequence, the second reaction force control circuit 42A does not execute the middle point learning process and the steer angle synchronization process, and transitions to the same control state as the first reaction force control circuit 41A.

In this case, the control state of the first reaction force control circuit 41A is the assist start waiting state. Therefore, the second reaction force control circuit 42A causes the control state of the second reaction force control circuit 42A to transition to the assist start waiting state. When the start-up process of the powertrain by the vehicle control device 60 is completed, the first reaction force control circuit 41A and the second reaction force control circuit 42A transition to the ordinary control state.

In the case where only the first reaction force control circuit 41A is reset, the first reaction force control circuit 41A after the reset executes the same process as the process in the case where only the second reaction force control circuit 42A is reset.

Second Processing Pattern

Next, a second processing pattern will be described.

Figure 6A:
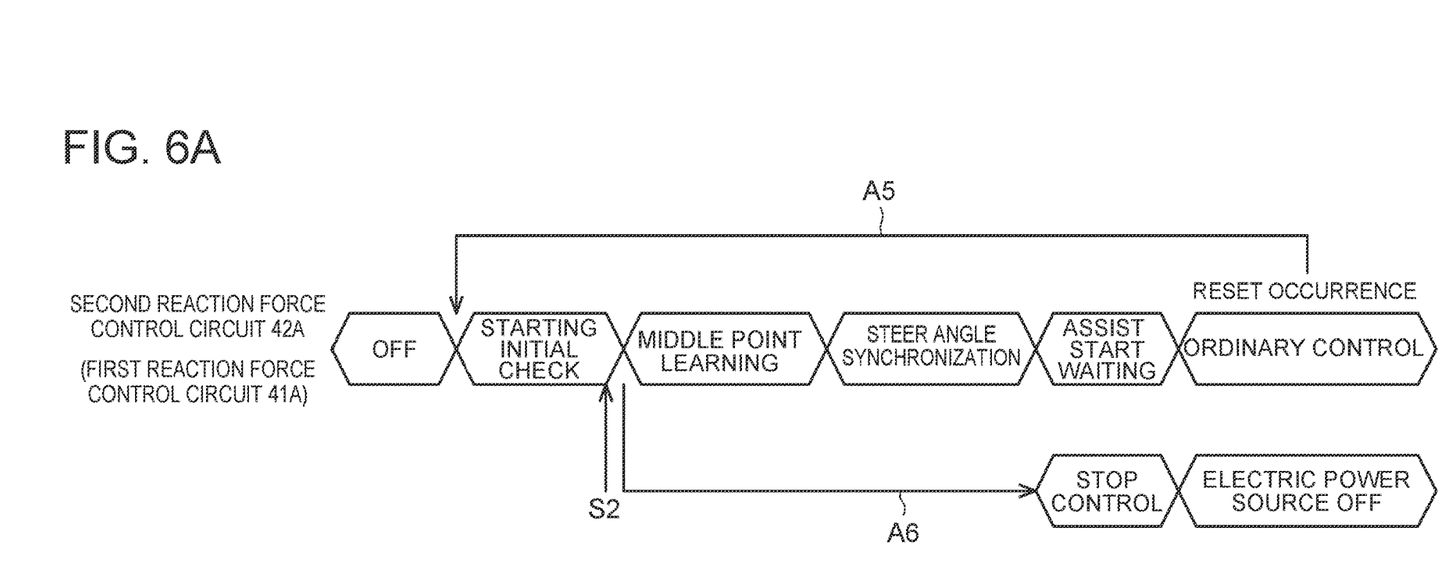
FIG. 6A is a time chart showing another exemplary state transition of the second reaction force control circuit in the embodiment.

Here again, a case where only the second reaction force control circuit 42A is reset when the control circuits are executing the ordinary control as shown in FIG. 6A will be described as an example. The other three control circuits (41A, 51A, 52A) continue the execution of the ordinary control.

As shown by an arrow A5 in FIG. 6A, after the reset is completed, the second reaction force control circuit 42A restarts. The second reaction force control circuit 42A that restarts starts the execution of the initial check. When the second reaction force control circuit 42A restarts, the first reaction force control circuit 41A that has not been reset confirms the state of the second reaction force control circuit 42A.

When the value of the flag stored in the memory of the second reaction force control circuit 42A is zero, the first reaction force control circuit 41A determines that the second reaction force control circuit 42A needs to continue the execution of the starting sequence. This is because the starting sequence has not been normally completed when the value of the flag is zero. The failure of the normal completion of the starting sequence includes the failure of the normal completion of the middle point learning process and the steer angle synchronization process. Therefore, when the value of the flag is zero, the steering neutral position of the steering wheel 11 that is stored in the memory is invalid, and cannot be used for the control of the reaction force motor 21.

When the value of the flag stored in the memory of the second reaction force control circuit 42A is zero, the first reaction force control circuit 41A executes a predetermined process as a fail-safe. That is, the first reaction force control circuit 41A executes a process for stopping the operations of the second system circuits 42, 52. This process is executed for preventing the interference between the control by the second reaction force control circuit 42A that continues the execution of the starting sequence and the control by the first reaction force control circuit 41A that continues the ordinary control. In addition, this process is executed for avoiding the steering wheel 11 from automatically rotating due to the continuation of the execution of the starting sequence by the second reaction force control circuit 42A.

When the value of the flag stored in the memory of the second reaction force control circuit 42A is zero, the first reaction force control circuit 41A turns on a stop request signal S2, for example. Turning on the stop request signal S2 means requesting the second reaction force control circuit 42A to stop the operation. The stop request signal S2 may be a flag.

As shown by an arrow A6 in FIG. 6A, when the stop request signal S2 is in the on-state, the second reaction force control circuit 42A does not continue the execution of the starting sequence, and executes a stop control for stopping the operation of the second reaction force control circuit 42A. The stop of the operation of the second reaction force control circuit 42A includes the stop of the electricity supply to the wound wire group N12 of the second system in the reaction force motor 21. When a predetermined period elapses from the start of the execution of the stop control, the second reaction force control circuit 42A shuts off the electricity supply to the second reaction force control circuit 42A, by turning off an electric power source relay of the second reaction force control circuit 42A. Thereby, the second reaction force control circuit 42A stops the operation. Accordingly, the mutual interference between the control by the first reaction force control circuit 41A and the control by the second reaction force control circuit 42A is avoided. Further, since the second reaction force control circuit 42A does not continue the execution of the starting sequence, the steering wheel 11 does not automatically rotate.

The second turning control circuit 52A recognizes that the stop request signal S2 has been turned on, by the communication with the second reaction force control circuit 42A. When the stop request signal S2 is in the on-state, the second turning control circuit 52A executes a stop control for stopping the operation of the second turning control circuit 52A. The stop of the operation of the second turning control circuit 52A includes the stop of the electricity supply to the wound wire group N22 of the second system in the turning motor 31. When a predetermined period elapses from the start of the execution of the stop control, the second turning control circuit 52A shuts off the electricity supply to the second turning control circuit 52A, by turning off an electric power source relay of the second turning control circuit 52A. Thereby, the second turning control circuit 52A stops the operation.

After the stop of the operations of the second reaction force control circuit 42A and the second turning control circuit 52A, the controls of the reaction force motor 21 and the turning motor 31 are continued by only the first system circuits 41, 51. That is, the drive mode of the reaction force motor 21 and the turning motor 31 transitions to the single-system drive mode in the first system. The first system is a system in which the reset has not occurred.

Incidentally, it is also possible that only the second reaction force control circuit 42A is reset when the control circuits are in the assist start waiting state. The other three control circuits (41A, 51A, 52A) are in the assist start waiting state. In this case, the second reaction force control circuit 42A executes the same process as the process when the reset is performed during the execution of the ordinary control.

Figure 6B:
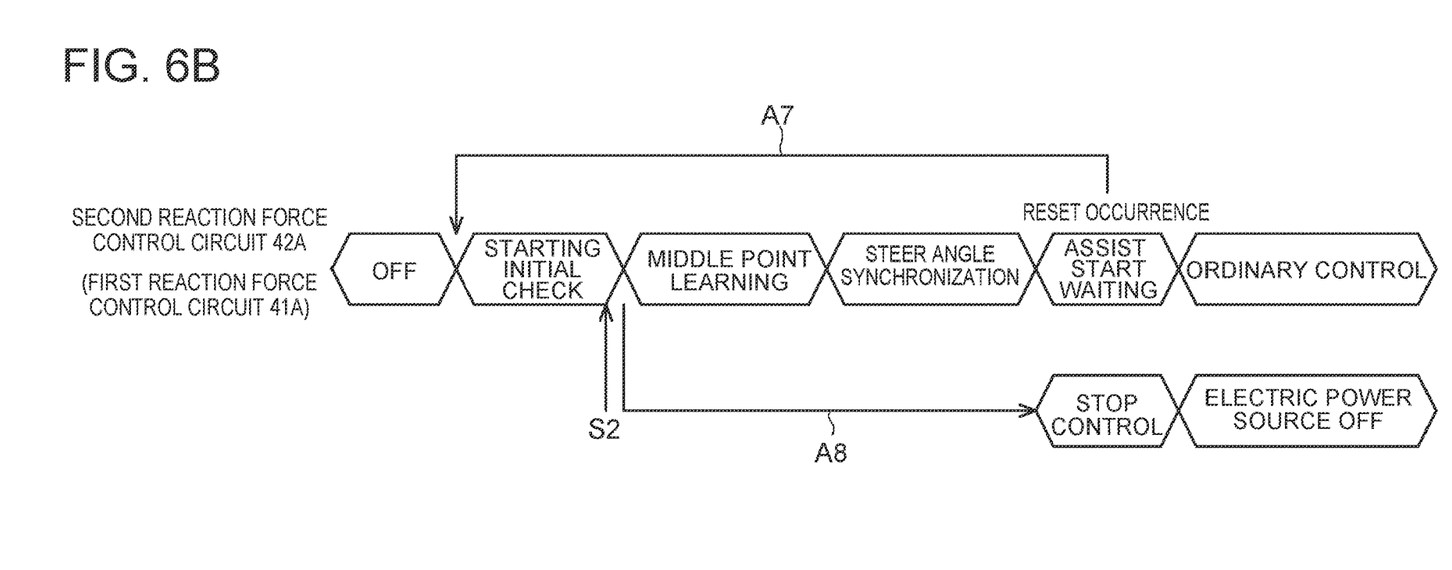
FIG. 6B is a time chart showing another exemplary state transition of the second reaction force control circuit in the embodiment.

As shown by an arrow A7 in FIG. 6B, after the reset is completed, the second reaction force control circuit 42A restarts. The second reaction force control circuit 42A that restarts starts the execution of the initial check. When the second reaction force control circuit 42A restarts, the first reaction force control circuit 41A that has not been reset confirms the state of the second reaction force control circuit 42A.

When the value of the flag stored in the memory of the second reaction force control circuit 42A is zero, the first reaction force control circuit 41A determines that the second reaction force control circuit 42A needs to continue the execution of the starting sequence, and turns on the stop request signal S2.

As shown by an arrow A8 in FIG. 6B, when the stop request signal S2 is in the on-state, the second reaction force control circuit 42A does not continue the execution of the starting sequence, and executes the stop control for stopping the operation of the second reaction force control circuit 42A.

The second turning control circuit 52A recognizes that the stop request signal S2 has been turned on, by the communication with the second reaction force control circuit 42A. When the stop request signal S2 is in the on-state, the second turning control circuit 52A executes the stop control for stopping the operation of the second turning control circuit 52A.

After the stop of the operations of the second reaction force control circuit 42A and the second turning control circuit 52A, the controls of the reaction force motor 21 and the turning motor 31 are continued by only the first system circuits 41, 51. That is, the drive mode of the reaction force motor 21 and the turning motor 31 transitions to the single-system drive mode in the first system.

In the case where only the first reaction force control circuit 41A is reset, the first reaction force control circuit 41A after the reset executes the same process as the process in the case where only the second reaction force control circuit 42A is reset.

Effects of Embodiment

With the embodiment, the following effects can be obtained.

(1) In the case where one of the two reaction force control circuits (41A, 42A) has been reset, when there remains the information indicating that the starting sequence has been normally completed, the reaction force control circuit that has been reset does not continue the execution of the starting sequence, at the time of the restarting after the completion of the reset. The starting sequence includes the process that requires the steering wheel 11 to automatically rotate. Since the execution of the starting sequence is not continued, it is possible to restrain an unintended behavior of the steering wheel 11 or the turning wheels 15. When there remains the information indicating that the starting sequence has been normally completed, the state where the value of the flag has been set to one has been maintained.

(2) At the time of the restarting after the completion of the reset, when there remains the information indicating that the starting sequence has been normally completed, the reaction force control circuit that has been reset does not continue the execution of the starting sequence, and causes its control state to transition to the control state of the reaction force control circuit that has not been reset. Therefore, after the completion of the reset of the reaction force control circuit that has been reset, the two reaction force control circuits can control the reaction force motor 21 in cooperation again.

(3) At the time of the restarting after the completion of the reset, when there does not remain the information indicating that the starting sequence has been normally completed, the reaction force control circuit that has been reset does not execute the starting sequence, and stops its own operation. Therefore, after the completion of the reset of the reaction force control circuit that has been reset, the reaction force control circuit that has been reset does not continue the execution of the starting sequence. Accordingly, it is possible to restrain an unintended behavior of the steering wheel 11 or the turning wheels 15 due to the execution of the starting sequence. When there does not remain the information indicating that the starting sequence has been normally completed, the state where the value of the flag has been set to zero has been maintained.

(4) At the time of the restarting of the reaction force control circuit that has been reset, when there does not remain the information indicating that the starting sequence has been normally completed, the reaction force control circuit that has not been reset executes the process for stopping the operation of the reaction force control circuit that has been reset and the operation of the turning control circuit (51A or 52A) of the system including the reaction force control circuit that has been reset, from a standpoint of the fail-safe. Examples of the process include a process of switching the stop request signal S2 from the off-state to the on-state. Therefore, after the stop of the operations of the reaction force control circuit and turning control circuit of the system in which the reset has occurred, the controls of the reaction force motor 21 and the turning motor 31 can be continued by the reaction force control circuit and turning control circuit of the system in which the reset has not occurred.

(5) The starting sequence includes the middle point learning process and the steer angle synchronization process. Each of the middle point learning process and the steer angle synchronization process is an example of the process that requires the steering wheel 11 to automatically rotate. In the case where the middle point learning process and the steer angle synchronization process are included in the starting sequence in this way, there is fear that the steering wheel 11 automatically rotates at the time of the starting of the reaction force control circuit. The embodiment may be suitable for the case where the middle point learning process and the steer angle synchronization process are included in the starting sequence.

OTHER EMBODIMENTS

The embodiment may be carried out while being modified as follows.

The content of the starting sequence that is executed by the first reaction force control circuit 41A and the second reaction force control circuit 42A at the time of the starting may be modified when appropriate. The starting sequence may include a process other than the middle point learning process and the steer angle synchronization process, as the process that requires the steering wheel 11 to automatically rotate.

At the time of the restarting of the reaction force control circuit (41A or 42A) that has been reset, whether the execution of the starting sequence needs to be continued is determined in the period after the start of the execution of the initial check and before the start of the execution of the middle point learning process. However, the following modification may be made. That is, at the time of the restarting of the reaction force control circuit that has been reset, whether the starting sequence needs to be executed may be determined before the start of the execution of the initial check. Thereby, whether to cause the control state of the reaction force control circuit that has been reset to transition to the control state of the reaction force control circuit that has not been reset and whether to stop the operation of the reaction force control circuit that has been reset can be determined at an earlier timing.

What is claimed is:

1. A steering control device comprising a first reaction force control circuit and a second reaction force control circuit, each of the first reaction force control circuit and the second reaction force control circuit being configured to:

control a reaction force motor configured to generate steering reaction force that is given to a steering wheel isolated from dynamic power transmission for a turning wheel of a vehicle;

execute, at a time of starting, a preparation process including a process that requires the steering wheel to automatically rotate through the reaction force motor; and store, at a time of completion of the execution of the preparation process, information indicating whether the preparation process has been normally completed, wherein in a case where the first reaction force control circuit has been reset, when the information indicates that the preparation process has been normally completed, the first reaction force control circuit that has been reset is configured to not execute the preparation process at a time of restarting after completion of the reset.

2. The steering control device according to claim 1, wherein at the time of restarting after the completion of the reset, when the information indicates that the preparation process has been normally completed, the first reaction force control circuit that has been reset is configured to not execute the preparation process, and to transition to a control state of the second reaction force control circuit that has not been reset.

3. The steering control device according to claim 1, wherein at the time of restarting after the completion of the reset, when the information does not indicate that the preparation process has been normally completed, the first reaction force control circuit that has been reset is configured to not execute the preparation process and to stop operation.

4. The steering control device according to claim 3, further comprising two turning control circuits, each of the two turning control circuits being configured to control a turning motor configured to generate turning force by which the turning wheel is turned, wherein:

one of the two turning control circuits and one of the first reaction force control circuit and the second reaction force control circuit constitute a single system, and at the time of restarting of the first reaction force control circuit that has been reset, when the information does not indicate that the preparation process has been normally completed, the second reaction force control circuit that has not been reset is configured to execute a process for stopping the operation of the first reaction force control circuit that has been reset and operation of the turning control circuit of the system including the first reaction force control circuit that has been reset.

5. The steering control device according to claim 1, wherein:

the preparation process includes a middle point learning process and a steer angle synchronization process;

the middle point learning process is a process of learning a steering neutral position of the steering wheel by automatically rotating the steering wheel through drive of the reaction force motor; and the steer angle synchronization process is a process of correcting a rotation position of the steering wheel such that the rotation position of the steering wheel becomes a rotation position corresponding to a turning position of the turning wheel.

* * * * *